United States Patent
Tamura et al.

(10) Patent No.: US 9,416,850 B2
(45) Date of Patent: Aug. 16, 2016

(54) DRIVE TRANSMISSION MECHANISM THAT ENSURES EXTENDED SERVICE LIFE IN REDUCED SIZE AND IMAGE FORMING APPARATUS INCLUDING THE SAME

(71) Applicant: KYOCERA Document Solutions Inc., Osaka (JP)

(72) Inventors: Yuki Tamura, Osaka (JP); Masahiko Mizuno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/822,409

(22) Filed: Aug. 10, 2015

(65) Prior Publication Data

US 2016/0053859 A1 Feb. 25, 2016

(30) Foreign Application Priority Data

Aug. 19, 2014 (JP) .................................. 2014-166722

(51) Int. Cl.
| | |
|---|---|
| G03G 15/00 | (2006.01) |
| F16H 3/08 | (2006.01) |
| F16D 27/00 | (2006.01) |
| G03G 21/16 | (2006.01) |

(52) U.S. Cl.
CPC ........ *F16H 3/08* (2013.01); *F16D 27/00* (2013.01); *G03G 15/757* (2013.01); *G03G 21/1647* (2013.01); *G03G 2221/1657* (2013.01)

(58) Field of Classification Search
CPC ............ G03G 15/757; G03G 15/5008; G03G 21/1647; G03G 21/1857; G03G 2221/1657; F16H 1/22; F16H 3/08; F16H 3/085; F16H 3/10; F16D 27/00

USPC ................................. 399/167; 192/84.1, 84.9
See application file for complete search history.

(56) References Cited

U.S. PATENT DOCUMENTS

| | | | |
|---|---|---|---|
| 6,742,641 B2 * | 6/2004 | Takasaka ................ | F16D 11/10 192/48.5 |
| 2003/0047407 A1 | 3/2003 | Murano et al. ............... | 192/84.1 |
| 2008/0211176 A1 * | 9/2008 | Miura ..................... | G03G 15/65 271/264 |

(Continued)

FOREIGN PATENT DOCUMENTS

| | | |
|---|---|---|
| JP | 2003-148516 A | 5/2003 |
| JP | 2004-100923 A | 4/2004 |

(Continued)

*Primary Examiner* — Robert Beatty
(74) *Attorney, Agent, or Firm* — Stein IP, LLC

(57) ABSTRACT

A drive transmission mechanism includes an electromagnetic clutch and a drive output gear. The electromagnetic clutch includes a clutch shaft, a clutch input gear, a clutch idler gear, and a clutch output gear. The drive transmission mechanism transmits driving power using a first drive transmission path or a second drive transmission path. The first drive transmission path includes the clutch idler gear, a first idler gear, and a first output gear unit to transmit driving power to a rotated member connected to a first output gear unit irrespective of the energizing or the non-energizing an electromagnetic clutch. The second drive transmission path includes the clutch output gear, a second idler gear, and a second output gear unit to transmit driving power to a rotated member connected to the second output gear unit only when the electromagnetic clutch is energized.

6 Claims, 10 Drawing Sheets

(56) References Cited

U.S. PATENT DOCUMENTS

2015/0153690 A1* 6/2015 Suzuki .............. G03G 15/2053 399/329
2015/0212456 A1* 7/2015 Imaizumi ........... G03G 21/1647 74/665 G
2016/0077484 A1* 3/2016 Hiroe ................ G03G 21/1647 399/167
2016/0091838 A1* 3/2016 Mizuno ............. G03G 15/1615 399/167

FOREIGN PATENT DOCUMENTS

JP    2007162906 A  *  6/2007
JP    2012180142 A  *  9/2012

* cited by examiner

DRIVE TRANSMISSION MECHANISM THAT ENSURES EXTENDED SERVICE LIFE IN REDUCED SIZE AND IMAGE FORMING APPARATUS INCLUDING THE SAME

INCORPORATION BY REFERENCE

This application is based upon, and claims the benefit of priority from, corresponding Japanese Patent Application No. 2014-166722 filed in the Japan Patent Office on Aug. 19, 2014, the entire contents of which are incorporated herein by reference.

BACKGROUND

Unless otherwise indicated herein, the description in this section is not prior art to the claims in this application and is not admitted to be prior art by inclusion in this section.

To separately control driving of a plurality of driven members, it increases the cost of the apparatus to dispose driving units, such as motors, by the number of driven members. Therefore, generally, one driving unit drives the respective driven members. Additionally, a clutch mechanism, which transmits and blocks a driving power, is disposed between the driving unit and the respective driven members.

For example, a drive transmission mechanism, which is used for a driving unit of an image forming apparatus using an electrophotographic method, such as a copier, a printer, and a facsimile, includes a continuous rotation drive train and an intermittent rotation drive train. The continuous rotation drive train continuously rotates the driven members during an image forming operation. The intermittent rotation drive train intermittently rotates the driven members, temporarily halts the operation of the driven members, or stops the driven members alone. Accordingly, an electromagnetic clutch may be built into the intermittent rotation drive train. For example, a certain technique discloses the following driving device. A drive motor and a drive gear are connected with a non-excitation electromagnetic clutch and a drive shaft for the electromagnetic clutch is made of a non-magnetic material.

With another technique discloses that a driving device includes a motor and a plurality of studs (rotation shafts). The studs rotatably support a plurality of respective gears, which are driven by the motor. This driving device includes the plurality of studs whose outer diameters are all different. The inner diameters of the plurality of gears correspond to the outer diameters of the respective studs. This prevents incorrect installation of the gears to the studs.

SUMMARY

A drive transmission mechanism according to one aspect of the disclosure transmits a driving power from a driving source. The drive transmission mechanism includes an electromagnetic clutch and a drive output gear. The electromagnetic clutch includes a clutch shaft, a clutch input gear, a clutch idler gear, and a clutch output gear, the clutch input gear surrounding at least a part of the clutch shaft and receiving the driving power. The clutch idler gear is coaxial with the clutch input gear and having a gear specification identical to the clutch input gear for receiving the driving power. The clutch output gear is secured to the clutch shaft. Energizing the electromagnetic clutch ensures transmission of the driving power from the clutch input gear to the clutch output gear. Non-energizing the electromagnetic clutch cuts off the transmission of a driving power from the clutch input gear to the clutch output gear. The drive output gear includes a first output gear unit and a second output gear unit. The first output gear is connected to the clutch idler gear via one or more first idler gear. The second output gear unit is connected to the clutch output gear via one or more second idler gear and located coaxially with the first output gear unit. The drive output gear ensures the first output gear unit and the second output gear unit to be independently rotatable. The drive transmission mechanism transmits the driving power using a first drive transmission path or a second drive transmission path. The first drive transmission path includes the clutch idler gear, the first idler gear, and the first output gear unit. The first drive transmission path transmits the driving power to a rotated member connected to the first output gear unit irrespective of the energizing or the non-energizing the electromagnetic clutch. The second drive transmission path includes the clutch output gear, the second idler gear, and the second output gear unit. The second drive transmission path transmits the driving power to a rotated member connected to the second output gear unit only when the electromagnetic clutch is energized.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
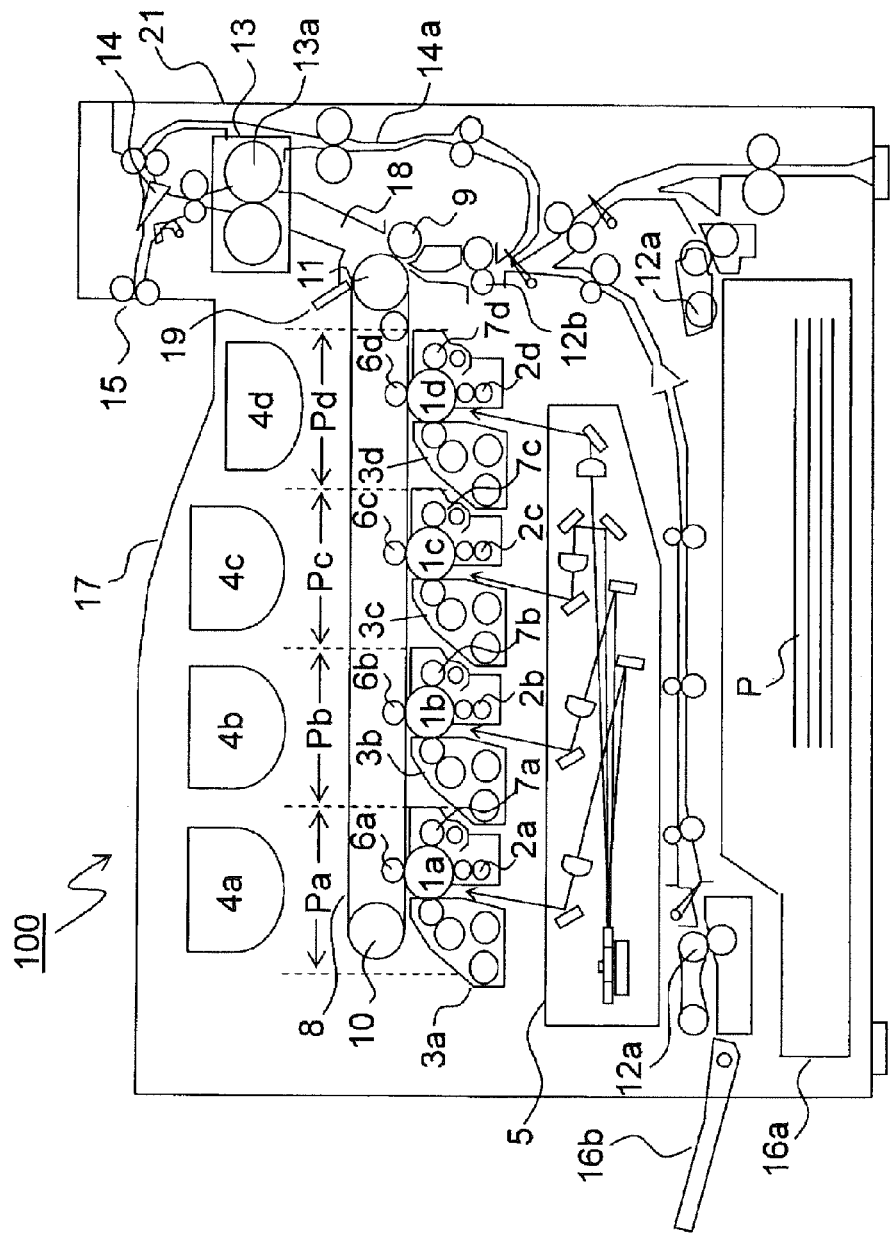
FIG. 1 schematically illustrates a configuration of a color printer that includes a first drive transmission unit that is an exemplary drive transmission mechanism according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings. FIG. 1 schematically illustrates a cross section of an internal configuration of a color printer 100 that includes a first drive transmission unit 20 as an exemplary drive transmission mechanism according to one embodiment of the disclosure. The color printer 100 employs a tandem system and includes four image forming units Pa, Pb, Pc and Pd located in this order from upstream in a conveyance direction (left side in FIG. 1) in a main body of the color printer 100. These image forming units Pa, Pb, Pc, and Pd are located corresponding to images of different four colors (cyan, magenta, yellow and black). The image forming units Pa, Pb, Pc, and Pd sequentially form images of cyan, magenta, yellow and black through respective processes of charge, exposure, development, and transfer.

These image forming units Pa to Pd include photoreceptor drums 1a, 1b, 1c and 1d that carry visible images (toner image) of respective colors. The image forming units Pa, Pb, Pc, and Pd further include an intermediate transfer belt 8 that rotates anticlockwise in FIG. 1 by a driving unit (not illustrated) and is adjacent to each of the image forming units Pa, Pb, Pc and Pd. Toner images formed on these photoreceptor drums 1a, 1b, 1c, and 1d are primarily transferred sequentially and superimposed on the intermediate transfer belt 8, which moves while in abutting contact with each of the photoreceptor drums 1a, 1b, 1c and 1d. Then the toner images are secondarily transferred on a paper sheet P, which is one example of a recording medium, by an action of a secondary transfer roller 9. Subsequently, a fixing unit 13 fixes the toner images on the paper sheet P, and then the main body of the color printer 100 discharges the paper sheet P. An image formation process to each of the photoreceptor drums 1a to 1d is performed while the photoreceptor drums 1a, 1b, 1c and 1d are rotated clockwise in FIG. 1.

The paper sheets P on which the toner images are to be transferred are housed in a sheet feed cassette 16a, which is below the main body of the color printer 100. Alternatively, the paper sheets P, on which the toner images are to be transferred, are loaded at a manual sheet feed tray 16b, which is located at a side surface of the main body of the color printer 100. The paper sheet P is conveyed to a nip area between the secondary transfer roller 9 and a drive roller 11 of the intermediate transfer belt 8 (described later) via a feed roller 12a and a registration roller pair 12b. The intermediate transfer belt 8 is made of dielectric resin sheet, and a jointless (seamless) belt is mainly used. At downstream of the secondary transfer roller 9, a blade-shaped belt cleaner 19 is located to remove a remnant toner or similar matter on the surface of the intermediate transfer belt 8.

Next, the following describes the image forming units Pa, Pb, Pc and Pd. Around and below the rotatably installed photoreceptor drums 1a, 1b, 1c, and 1d, chargers 2a, 2b, 2c, and 2d, an exposure apparatus 5, developing devices 3a, 3b, 3c, and 3d, and cleaning apparatuses 7a, 7b, 7c, and 7d are installed. The chargers 2a, 2b, 2c and 2d charge the photoreceptor drums 1a, 1b, 1c and 1d, respectively. The exposure apparatus 5 exposes image information to each of the photoreceptor drums 1a to 1d. The developing devices 3a, 3b, 3c and 3d form toner images on the photoreceptor drums 1a to 1d. The cleaning apparatuses 7a, 7b, 7c and 7d remove a remnant developer (toner) or similar matter on the photoreceptor drums 1a to 1d.

When image data is input from a host apparatus, such as a personal computer, first, the chargers 2a to 2d evenly charge the surfaces of the photoreceptor drums 1a to 1d. Next, the exposure apparatus 5 irradiates each of the photoreceptor drums 1a to 1d with light based on the image data to form an electrostatic latent image corresponding to the image data on each of the photoreceptor drums 1a to 1d. The developing devices 3a to 3d are filled with predetermined amounts of two-component developers including toners of respective colors of cyan, magenta, yellow, and black. When a proportion of toner in the two-component developer filled in each of the developing devices 3a to 3d becomes less than a specified value due to toner image formation described below, toner containers 4a to 4d replenish the respective developing devices 3a to 3d with toners. The toners in the two-component developer are supplied and electrostatically attached onto the photoreceptor drums 1a to 1d by the developing devices 3a to 3d. This forms the toner image corresponding to the electrostatic latent image formed by the exposure from the exposure apparatus 5.

Then, primary transfer rollers 6a to 6d apply a predetermined transfer voltage between the primary transfer rollers 6a to 6d and the photoreceptor drums 1a to 1d, and the toner images of cyan, magenta, yellow, and black on the photoreceptor drums 1a to 1d are primarily transferred on the intermediate transfer belt 8. These four-color images are formed with a predetermined positional relationship for a predetermined full-color image formation. Subsequently, to prepare for new electrostatic latent image formation to be continuously performed, the cleaning apparatuses 7a to 7d remove a remnant toner or similar matter on the surface of the photoreceptor drums 1a to 1d after the primary transfer.

The intermediate transfer belt 8 is bridged across a tension roller 10 at an upstream side and the drive roller 11 at a downstream side. When the intermediate transfer belt 8 starts to rotate counterclockwise along with rotation of the drive roller 11 by a drive motor (not illustrated), the registration roller pair 12b conveys the paper sheet P to a nip area (secondary transfer nip area) between the drive roller 11 and the secondary transfer roller 9, which is located adjacent to the drive roller 11, at a predetermined timing. This transfers a full-color image on the intermediate transfer belt 8 onto the paper sheet P. Then, the paper sheet P, on which the toner image has been transferred, passes through a paper sheet conveyance passage 18, and conveyed to the fixing unit 13.

The paper sheet P conveyed to the fixing unit 13 is heated and pressured by a fixing roller pair 13a. Then the toner image is fixed on the surface of the paper sheet P, thus forming a predetermined full-color image. The paper sheet P, on which the full-color image is formed, is sorted into a conveyance direction by a branching portion 14, which branches into a plurality of directions. When the image is formed on only one surface of the paper sheet P, a discharge roller pair 15 directly discharges the paper sheet P to the discharge tray 17.

On the other hand, when the image is formed on both surfaces of the paper sheet P, the paper sheet P, which has passed the fixing unit 13, is once conveyed in the discharge roller pair 15 direction. After a rear end of the paper sheet P passes the branching portion 14, the discharge roller pair 15 is inversely rotated, and a conveying direction of the branching portion 14 is switched. Then, the paper sheet P is sorted into an inverting conveyance path 14a from the rear end of the paper sheet P, and conveyed to the secondary transfer nip area again with the inverted image surface. Then, the secondary transfer roller 9 transfers the next image formed on the intermediate transfer belt 8 on the back surface of the paper sheet P. After the paper sheet P is conveyed to the fixing unit 13 to fix the toner image, the paper sheet P is discharged to the discharge tray 17.

Figure 2:
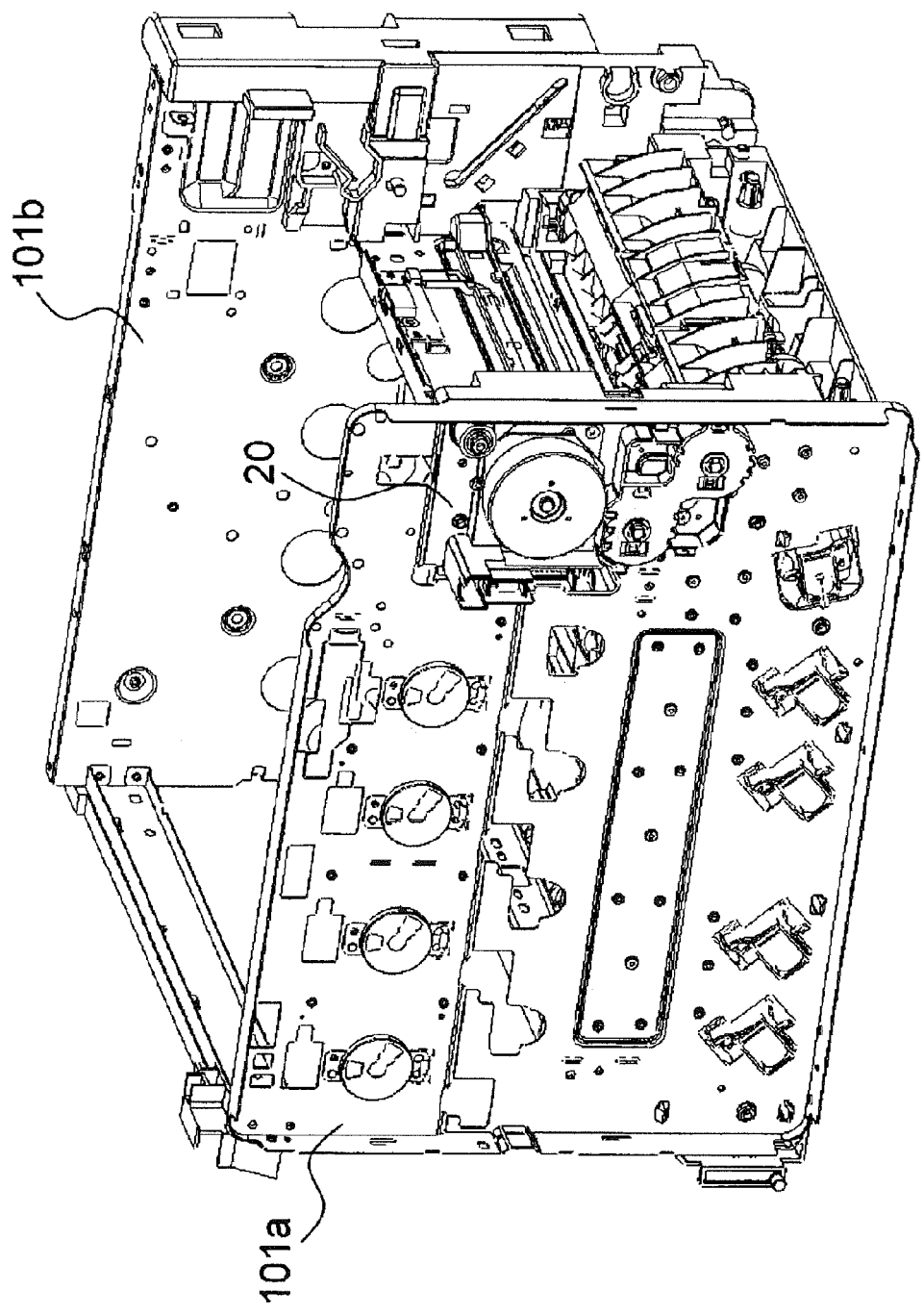
FIG. 2 perspectively illustrates a frame configuration of the color printer according to the one embodiment.

FIG. 2 perspectively illustrates a frame configuration of the color printer 100 according to the one embodiment. Inside the side surface of the color printer 100, side surface frames 101*a* and 101*b* made of sheet metal are located. On the side surface frame 101*a* (at a front side in FIG. 2), which is one of the side surface frames, the first drive transmission unit 20 and a second drive transmission unit 50 are mounted from an inside of the side surface frame 101*a*. The first drive transmission unit 20 transmits a driving power to the photoreceptor drums 1*a* to 1*d*, the developing device 3*a* to 3*d* (see FIG. 1), and similar member. In FIG. 2, only a part of the first drive transmission unit 20 is exposed to an outside of the side surface frame 101*a*.

Figure 3:
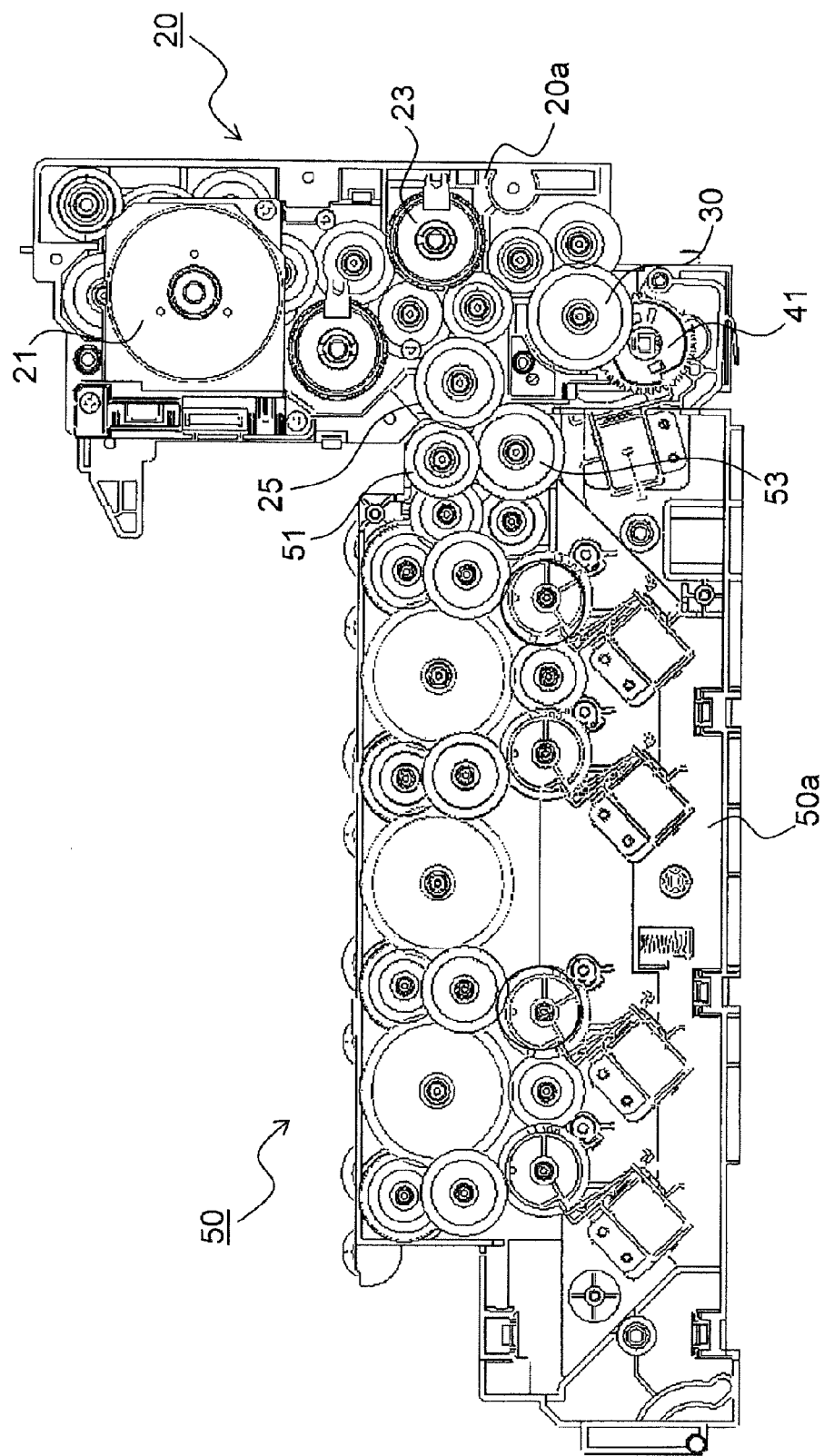
FIG. 3 illustrates a state where the first drive transmission unit and a second drive transmission unit according to the one embodiment are connected in a plan view.
Figure 4:
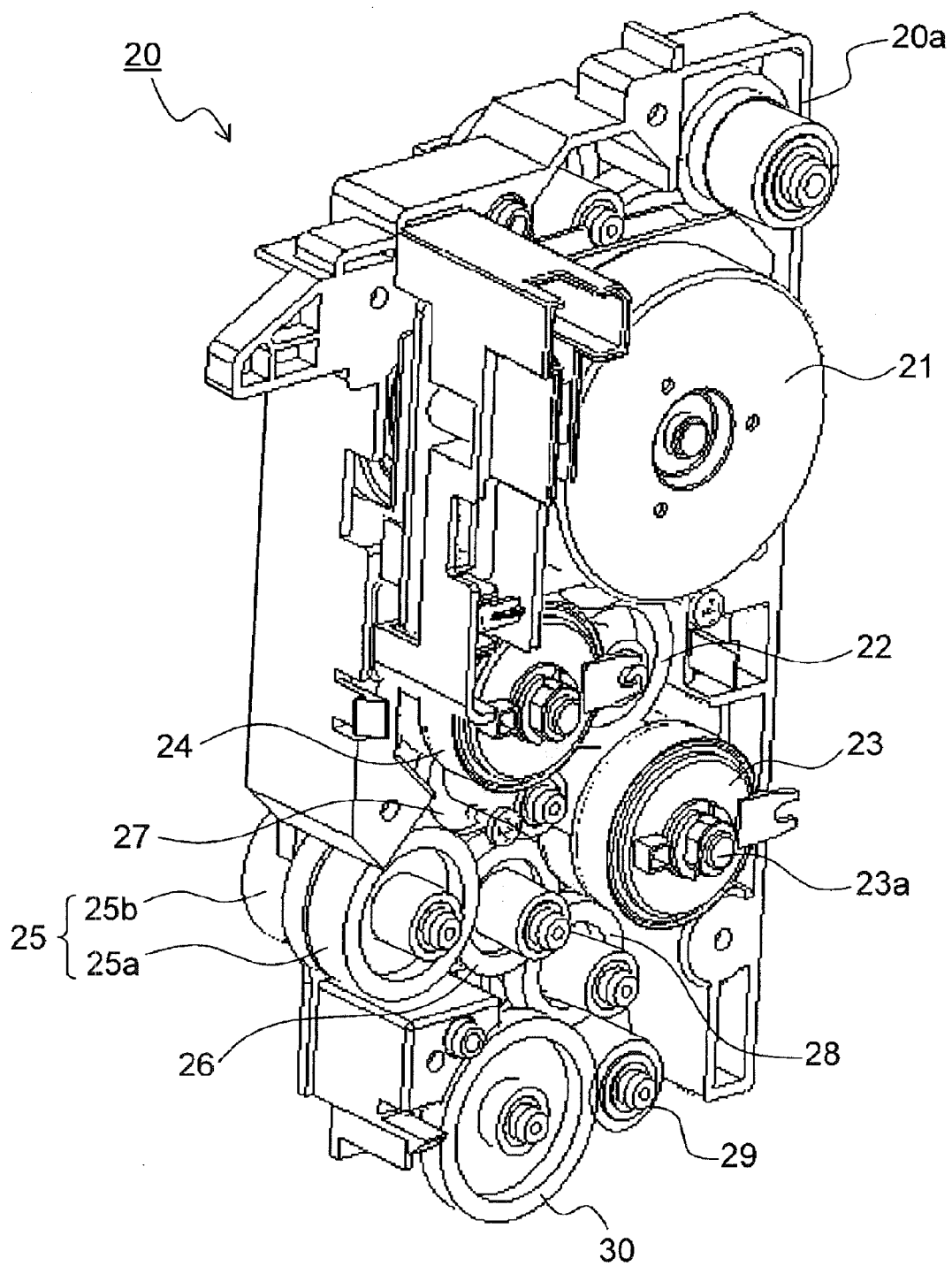
FIG. 4 perspectively illustrates the first drive transmission unit according to the one embodiment.
Figure 5:
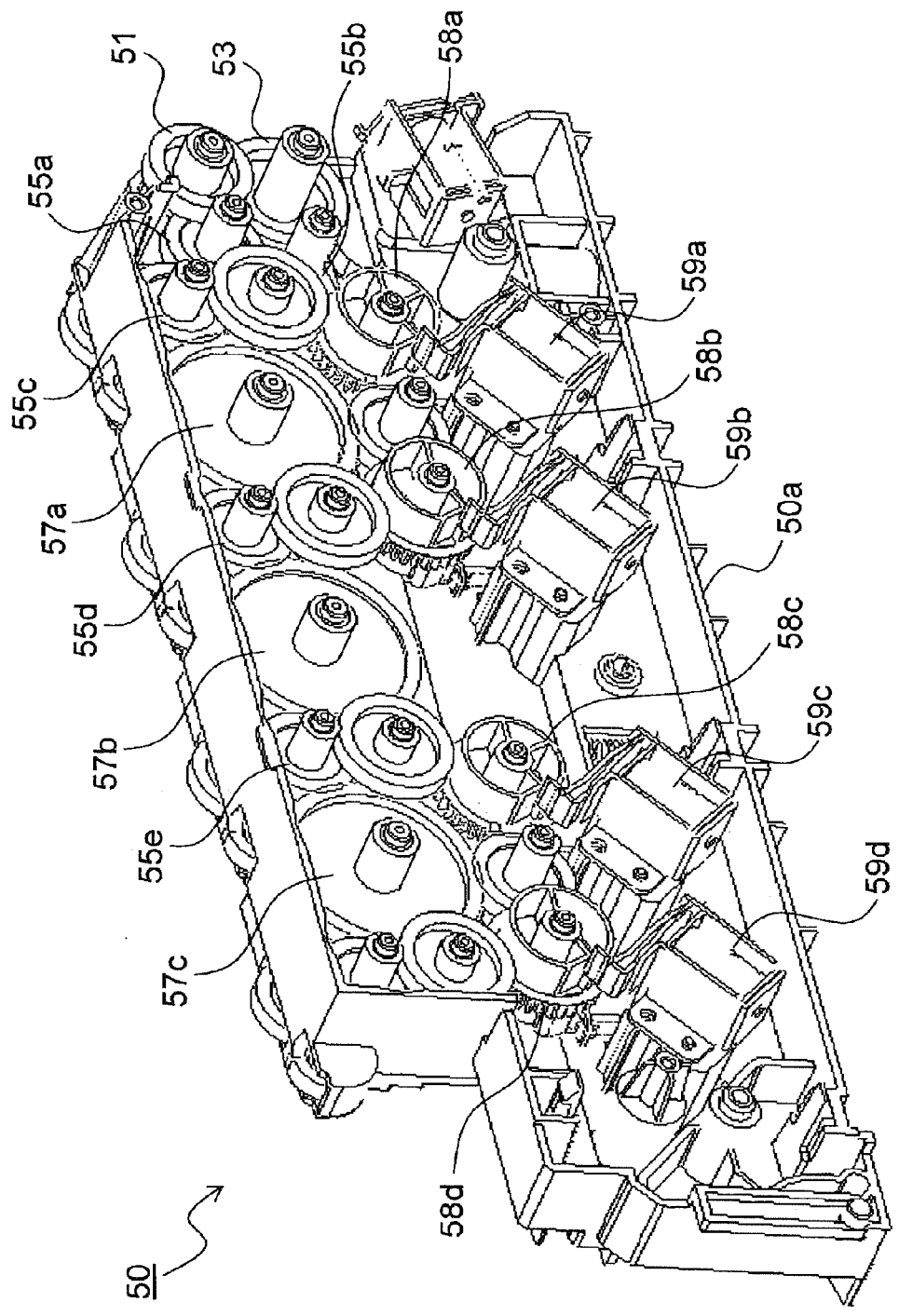
FIG. 5 perspectively illustrates the second drive transmission unit according to the one embodiment.

FIG. 3 illustrates a state where the first drive transmission unit 20 and the second drive transmission unit 50 according to the one embodiment are connected in a plan view. FIG. 4 perspectively illustrates the first drive transmission unit 20. FIG. 5 perspectively illustrates the second drive transmission unit 50. The first drive transmission unit 20 includes a motor 21, the electromagnetic clutches 23 and 24, and a plurality of gears including a first drive output gear 25 and a second drive output gear 30, which are mounted on a first unit housing 20*a*.

Figure 6:
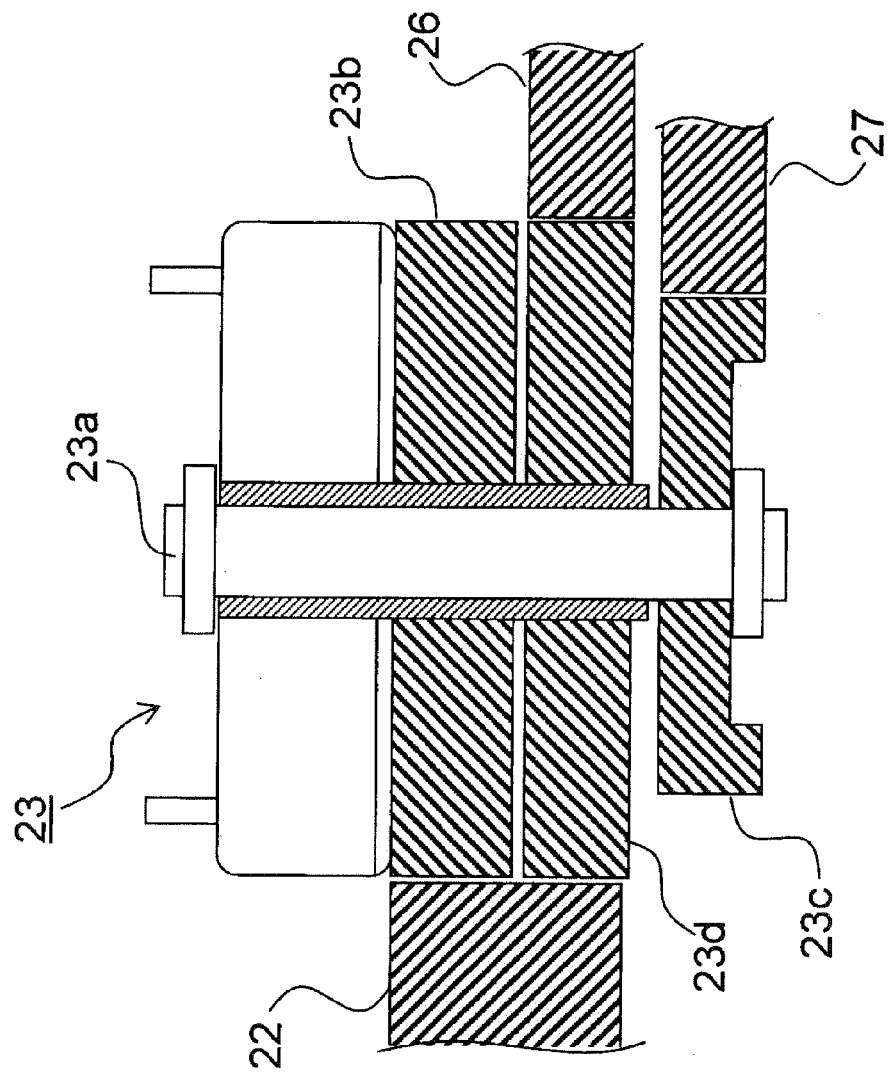
FIG. 6 schematically illustrates a cross section of an electromagnetic clutch according to the one embodiment.

FIG. 6 schematically illustrates a cross section of the electromagnetic clutch 23 according to the one embodiment. The electromagnetic clutch 23 includes a clutch shaft 23*a*, a clutch input gear 23*b*, a clutch output gear 23*c*, a clutch idler gear 23*d*, and an electromagnetic clutch unit (not illustrated). The clutch input gear 23*b* is located coaxially with the clutch shaft 23*a* so as to surround at least a part of the clutch shaft 23*a*. The clutch output gear 23*c* is secured to the clutch shaft 23*a*. The clutch idler gear 23*d* is coaxial with the clutch input gear 23*b*, and has a gear specification identical to the clutch input gear 23*b*. The electromagnetic clutch unit (not illustrated) is embedded between the clutch shaft 23*a* and the clutch input gear 23*b*. A gear specification includes a count of gear teeth, a screw direction, and a pressure angle, and an identical gear specification is defined to have an identical count of gear teeth, an identical screw direction, and an identical pressure angle.

The clutch input gear 23*b* and the clutch idler gear 23*d* of the electromagnetic clutch 23 are driven and connected to the motor 21 via a motor side input gear 22. The clutch idler gear 23*d* is meshed with a first idler gear 26. The clutch output gear 23*c* is meshed with the second idler gear 27.

The electromagnetic clutch 23 applies electrical current to a coil in the electromagnetic clutch unit so as to cause a movable piece (armature) engaged with the clutch input gear 23*b* to be attracted and brought into pressure contact with a rotor engaged with the clutch shaft 23*a* using electromagnetic force. This integrally drives the clutch shaft 23*a* (the clutch output gear 23*c*) and the clutch input gear 23*b*.

When the clutch input gear 23*b* is meshed with the first idler gear 26, the clutch input gear 23*b* can also function as the clutch idler gear 23*d*. In that case, the clutch input gear 23*b* is meshed with the motor side input gear 22 and the first idler gear 26. When the clutch input gear 23*b* is a gear, such as a helical gear, a force of which is easily applied in a thrust direction (which is a clutch shaft 23*a* direction), the force is applied to cause the clutch input gear 23*b* to be twisted in the thrust direction. This shortens lifespan of the electromagnetic clutch 23.

In the embodiment, the clutch idler gear 23*d*, which is coaxially with and has the gear specification identical to the clutch input gear 23*b*, is disposed separately from the clutch input gear 23*b*. This causes a driving power to be transmitted to the first idler gear 26 via the clutch idler gear 23*d*. This reduces a twist of the clutch input gear 23*b* in the thrust direction, and ensures an extended lifespan of the electromagnetic clutch 23.

The electromagnetic clutch 24 intermittently transmits a rotary drive power to the registration roller pair 12*b* (see FIG. 1). The electromagnetic clutch 24 has a configuration similar to the electromagnetic clutch 23.

As illustrated in FIG. 4, the first drive output gear 25 includes a first output gear unit 25*a* and a second output gear unit 25*b*, which are independently rotatable. The first output gear unit 25*a* is meshed with the first idler gear 26. The second output gear unit 25*b* is a two-step gear that includes a large-diameter portion 33 and a small-diameter portion 34 (see FIG. 9). The large-diameter portion 33 is meshed with the second idler gear 27, and the small-diameter portion 34 is meshed with a third driving input gear 54 (see FIG. 9).

The second drive output gear 30 is drivably connected to the motor 21 via the first idler gear 26, a third idler gear 28, and a fourth idler gear 29. The second drive output gear 30 continuously transmits the rotary drive power to a lift plate elevating gear 41 (see FIG. 3) that elevates a lift plate of the sheet feed cassette 16*a*.

As illustrated in FIG. 5, the second drive transmission unit 50 includes, for example, a first driving input gear 51, a second driving input gear 53, the third driving input gear 54 (see FIG. 8), intermediate gears 55*a* to 55*e*, large-diameter gears 57*a* to 57*c*, a plurality of gear trains including teeth missing gears 58*a* to 58*d* or similar gears, and solenoids 59*a* to 59*d*, which are mounted on a second unit housing 50*a*.

The first driving input gear 51 continuously transmits the rotary drive power to replenishment screws of the toner containers 4*a* to 4*d* (see FIG. 1) and a recovery screw (not illustrated) that conveys waste toner to a toner recovery bottle via the gear train. The solenoids 59*a* to 59*d* cut off transmission of the rotary drive power to the replenishment screws of the toner containers 4*a* to 4*d* in conjunction with the teeth missing gears 58*a* to 58*d*, and transmit the rotary drive power to the replenishment screws for only toner replenishment. The second driving input gear 53 intermittently transmits the rotary drive power to the feed roller 12*a* (see FIG. 1) of the manual sheet feed tray 16*b*.

Figure 7:
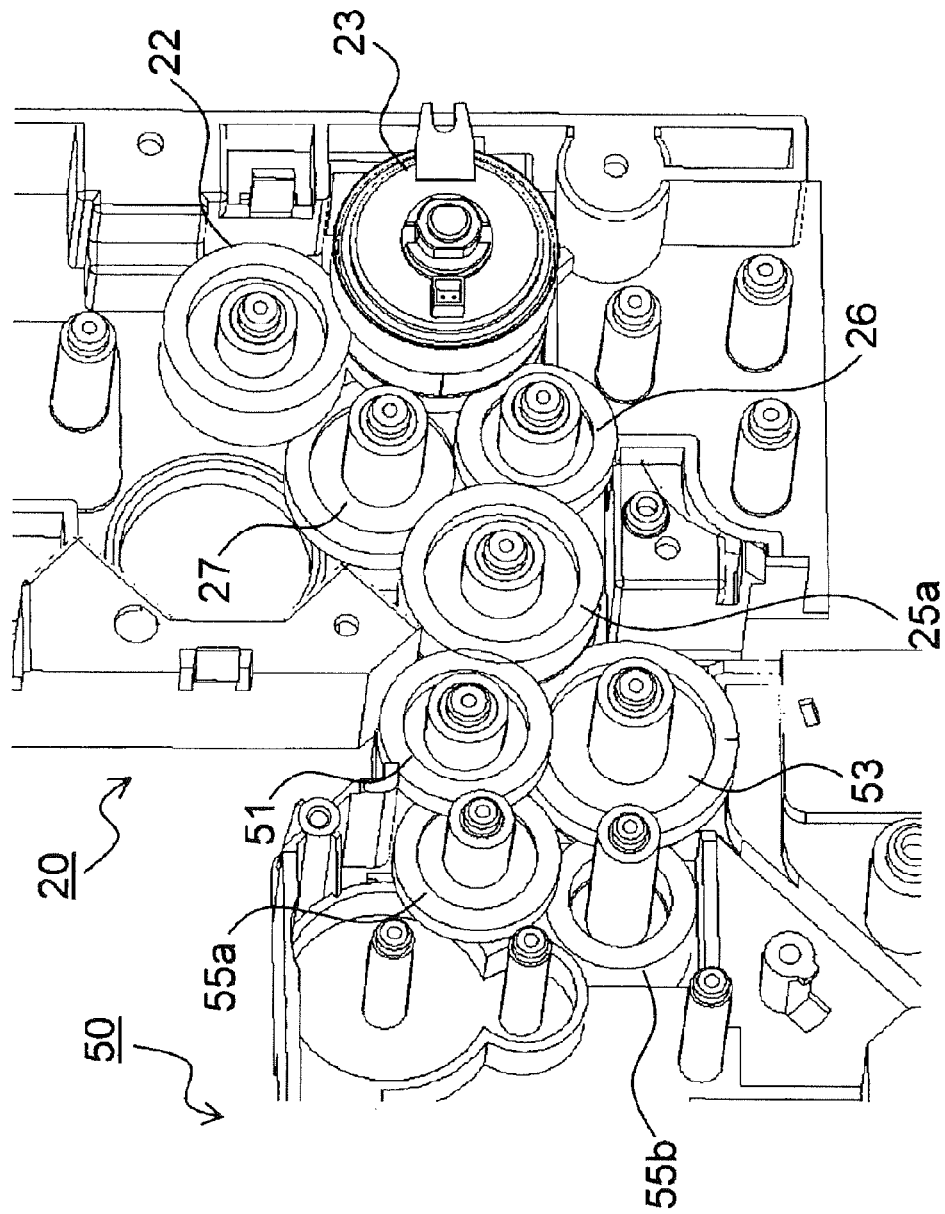
FIG. 7 perspectively illustrates an enlarged connecting portion periphery of the first drive transmission unit and the second drive transmission unit according to the one embodiment.
Figure 8:
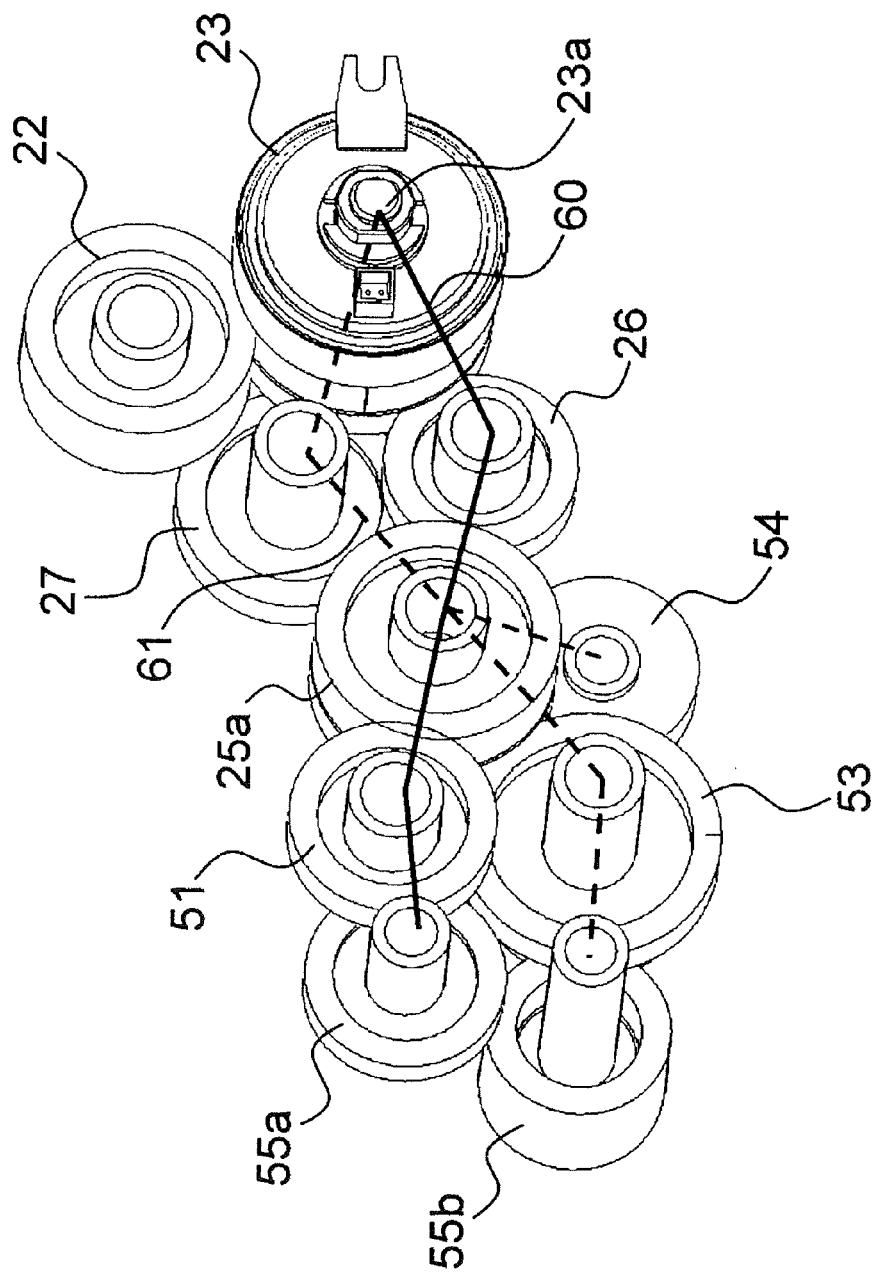
FIG. 8 illustrates a gear train according to the one embodiment from a front surface side.
Figure 9:
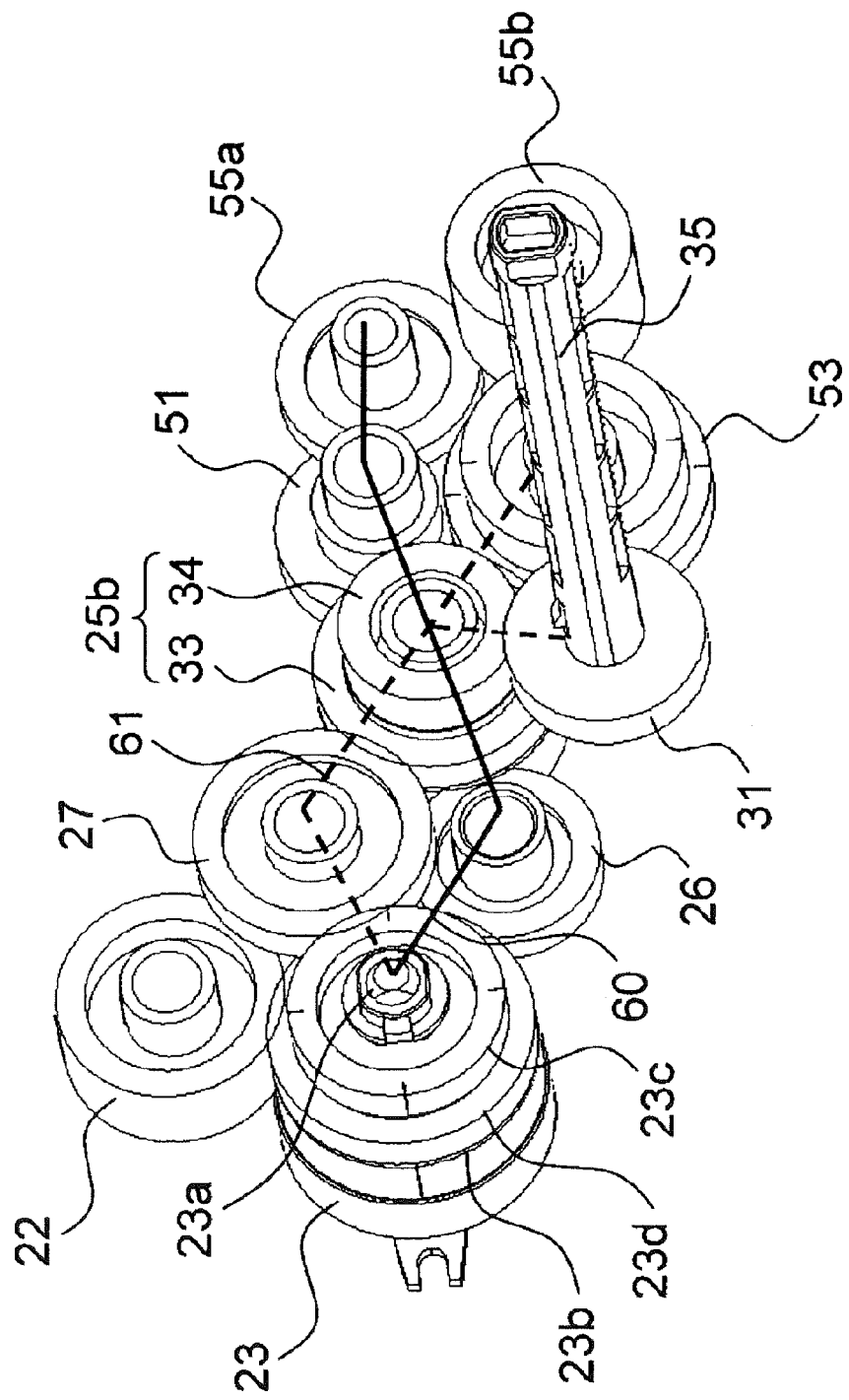
FIG. 9 illustrates the gear train according to the one embodiment from a back surface side.

FIG. 7 perspectively illustrates an enlarged connecting portion periphery of the first drive transmission unit 20 and the second drive transmission unit 50 according to the one embodiment. FIG. 8 and FIG. 9 illustrate the gear train illustrated in FIG. 7 from a front surface side and a back surface side, respectively. Referring to FIG. 1 to FIG. 6 as necessary and referring to FIG. 7 to FIG. 9, the following describes the transmission of the driving power from the first drive transmission unit 20 to the second drive transmission unit 50.

As illustrated in FIG. 8 and FIG. 9, under connection between the first drive transmission unit 20 and the second drive transmission unit 50, the first driving input gear 51 is meshed with the first output gear unit 25*a* of the first drive output gear 25. The second driving input gear 53 is meshed with the second output gear unit 25*b* of the first drive output gear 25.

First, the following describes a case where the electromagnetic clutch 23 is not energized. A driving power of the motor 21 is transmitted to the motor side input gear 22 via a gear train (not illustrated) including a pinion gear, which is secured to an output shaft, and then the driving power is transmitted to the clutch input gear 23*b*, which is meshed with the motor side input gear 22, of the electromagnetic clutch 23. Here, under a state where the electromagnetic clutch 23 is not energized, the movable piece engaged with the clutch input gear 23*b* and a roller engaged with the clutch shaft 23*a* are separated. Thus, only the clutch input gear 23*b* meshed with the motor side input gear 22 and the clutch idler gear 23*d* rotates, while the clutch output gear 23*c* stops along with the clutch shaft 23*a*.

Then, along with rotation of the clutch idler gear 23*d*, the first idler gear 26 meshed with the clutch idler gear 23*d* rotates. This causes the first output gear unit 25*a*, which is in the first drive output gear 25, meshed with the first idler gear 26 to rotate. Thus, the driving power is transmitted to the first driving input gear 51, which is in the second drive transmission unit 50, meshed with the first output gear unit 25*a*. This causes the replenishment screws of the toner containers 4*a* to 4*d* and the recovery screw, which conveys the waste toner to the toner recovery bottle, to rotate. The clutch idler gear 23*d* of the electromagnetic clutch 23, the first idler gear 26, and the first output gear unit 25*a* of the first drive output gear 25 constitute a first drive transmission path 60 (continuous rotation drive train illustrated by the solid line in FIG. 8 and FIG. 9). The first drive transmission path 60 transmits the driving power of the motor 21 to the first driving input gear 51 irrespective of energization of the electromagnetic clutch 23.

Additionally, since the second drive output gear 30 connected with the first idler gear 26 via the third idler gear 28 and the fourth idler gear 29 rotates, this transmits the driving power to the lift plate elevating gear 41, which elevates the lift plate of the sheet feed cassette 16*a*, from the second drive output gear 30.

Next, the following describes a case where the electromagnetic clutch 23 is energized. Under a state where the electromagnetic clutch 23 is energized, the movable piece engaged with the clutch input gear 23*b* and the roller engaged with the clutch shaft 23*a* are attracted one another. Thus, the clutch input gear 23*b* and the clutch shaft 23*a* integrally rotate, while the clutch output gear 23*c* secured to the clutch shaft 23*a* rotates along with the clutch input gear 23*b*.

Then, the second idler gear 27 meshed with the clutch output gear 23*c* rotates along with rotation of the clutch output gear 23*c*, this causes the second output gear unit 25*b*, which is in the first drive output gear 25, meshed with the second idler gear 27 to rotate. This transmits the driving power to the second driving input gear 53, which is in the second drive transmission unit 50, meshed with the large-diameter portion 33 of the second output gear unit 25*b*, and the feed roller 12*a* of the manual sheet feed tray 16*b* is intermittently and rotatably driven. This transmits the driving power to the third driving input gear 54 meshed with the small-diameter portion 34 of the second output gear unit 25*b*, and the feed roller 12*a* of the sheet feed cassette 16*a* is intermittently and rotatably driven via the shaft 35.

Only when the electromagnetic clutch 23 is energized, the clutch output gear 23*c* of the electromagnetic clutch 23, the second idler gear 27, and the second output gear unit 25*b* of the first drive output gear 25 constitute a second drive transmission path 61 (intermittent rotation drive train illustrated by the dashed line in FIG. 8 and FIG. 9). The second drive transmission path 61 transmits the driving power of the motor 21 to the second driving input gear 53 and the third driving input gear 54.

Namely, when the electromagnetic clutch 23 is not energized, drive to the first driving input gear 51 is transmitted while drive to the second driving input gear 53 and a third driving input gear 54 is not transmitted. Consequently, under a state where the sheet feed cassette 16*a* and the feed roller 12*a* of the manual sheet feed tray 16*b* are stopped, the replenishment screws of the toner container 4*a* to 4*d* and the recovery screw, which conveys the waste toner to the toner recovery bottle, can be rotatably driven. On the other hand, when the electromagnetic clutch 23 is energized, drive to the first driving input gear 51, the second driving input gear 53, and the third driving input gear 54 is transmitted. Consequently, the feed roller 12*a*, the replenishment screws of the toner containers 4*a* to 4*d*, and the recovery screw of the waste toner can be simultaneously and rotatably driven.

According to a configuration described above, a part of the gear train that constitutes the first drive transmission path 60 that transmits the driving power of the motor 21 to the first driving input gear 51, and a part of the gear train that constitutes the second drive transmission path 61 that transmits the driving power of the motor 21 to the second driving input gear 53 can be coaxially located. Specifically, the clutch output gear 23*c* and the clutch idler gear 23*d*, which are in the electromagnetic clutch 23, and the first output gear unit 25*a* and the second output gear unit 25*b*, which are in the first drive output gear 25, are coaxially located.

Consequently, it is unnecessary to bypass and locate the respective gears for avoiding interference of the mutual gear trains, which constitute the first drive transmission path 60 and the second drive transmission path 61, thus ensuring the reduced count of gears and the reduced arrangement space. This ensures the saved cost and downsized first drive transmission unit 20.

The first driving input gear 51 and the second driving input gear 53, which are in the second drive transmission unit 50, are respectively meshed with the first output gear unit 25*a* and the second output gear unit 25*b*, which are in the first drive output gear 25 of the first drive transmission unit 20. This causes one place to transmit the driving power from the first drive transmission unit 20 to the second drive transmission unit 50.

Thus, when installing the first drive transmission unit 20 and the second drive transmission unit 50 onto the side surface frame 101*a*, simply meshing the mutual gears at one place connects the first drive transmission unit 20 and the second drive transmission unit 50.

The first output gear unit 25*a* and the large-diameter portion 33 of the second output gear unit 25*b* have the identical gear specification. This avoids interference of the gear teeth when the first output gear unit 25*a* is meshed with the first driving input gear 51 while the second output gear unit 25*b* is meshed with the second driving input gear 53. This ensures installation of the first drive transmission unit 20 and the second drive transmission unit 50 in any order. Consequently, this ensures the improved installation work of the first drive transmission unit 20 and the second drive transmission unit 50.

Figure 10:
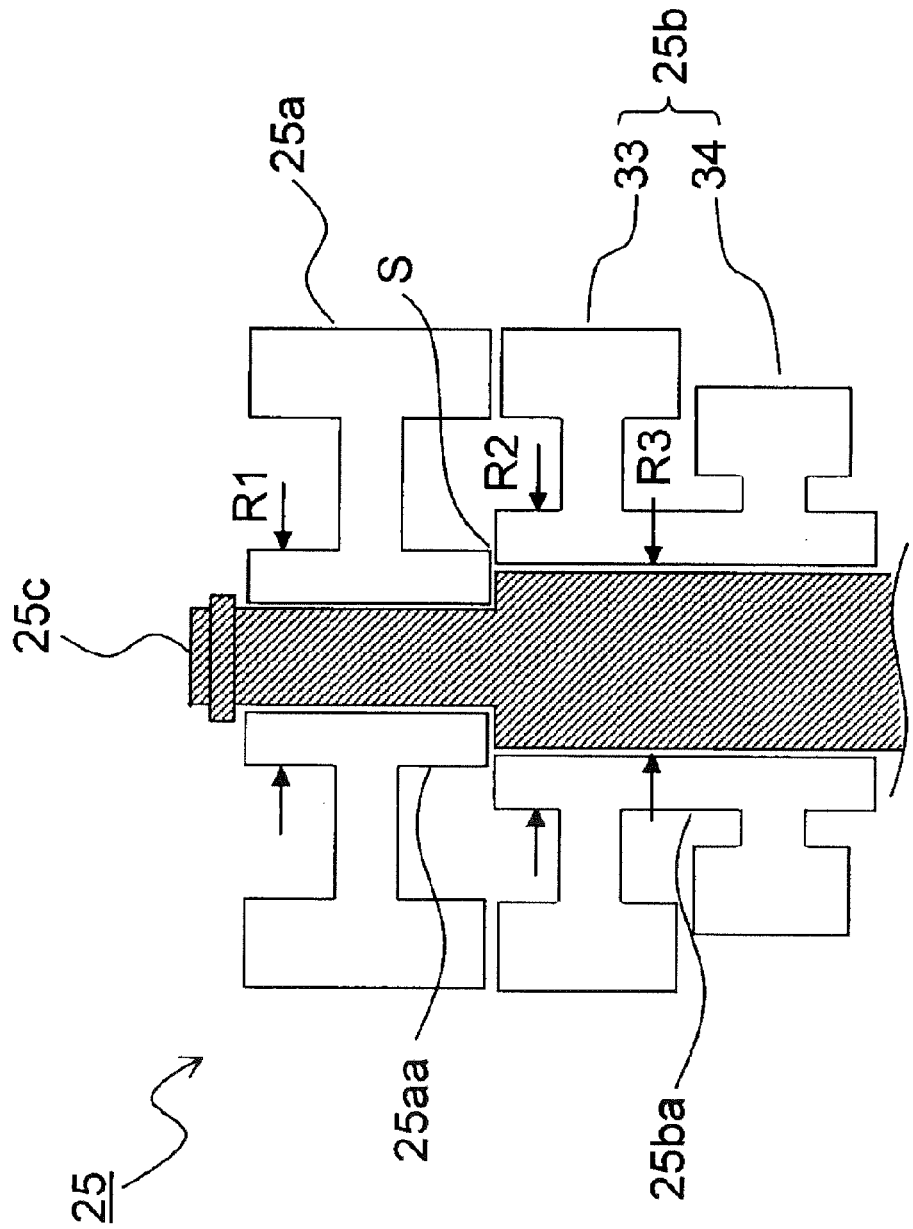
FIG. 10 illustrates a cross section where a first drive output gear according to the one embodiment is cut off along a rotation shaft.

As illustrated in FIG. 10, a rotation shaft 25*c*, which rotatably supports the first drive output gear 25, has a step. The rotation shaft 25*c* includes a portion with a small outer diameter, which is inserted into the first output gear unit 25*a*. The rotation shaft 25*c* includes a portion with a large outer diameter, which is inserted into the second output gear unit 25*b*. Namely, the first output gear unit 25*a* includes a first boss portion 25*aa* with a diameter (outer diameter) R1 different from a diameter (outer diameter) R2 of a second boss portion 25*ba* of the second output gear unit 25*b*. Consequently, this ensures the reduced contact area of a contacting portion S between the first boss portion 25*aa* and the second boss portion 25*ba*, thus ensuring the reduced influence between the respective rotations of the first output gear unit 25*a* and the second output gear unit 25*b*.

The diameter (outer diameter) R1 of the first boss portion 25*aa* of the first output gear unit 25*a* is smaller than the diameter (outer diameter) R2 of the second boss portion 25*ba* of the second output gear unit 25*b*, and larger than an inner diameter R3 of the second boss portion 25*ba*. This ensures the regulated movement of the first output gear unit 25*a* toward the second output gear unit 25*b*.

Furthermore, when the electromagnetic clutch 23 is not energized, a driving power of the clutch input gear 23*b* is not transmitted to the clutch output gear 23*c*. However, an action of friction force between the clutch shaft 23*a* and a shaft receiving surface of the clutch input gear 23*b* may cause the clutch shaft 23*a* and the clutch output gear 23*c* to corotate when the clutch input gear 23*b* rotates.

Here, a load with a magnitude for preventing corotation of the clutch output gear 23*c* due to rotation of the clutch input gear 23*b* is applied to a downstream of the clutch output gear 23*c* in a driving power transmission direction of the second drive transmission path 61. Specifically, the nip areas of the feed rollers 12*a* of the respective sheet feed cassette 16*a* and manual sheet feed tray 16*b*, which are connected to the end in downstream of the second drive transmission path 61, cause the load for preventing the corotation of the clutch output gear 23*c*.

The disclosure is not limited to the embodiments described above, and may be variously modified without substantially departing from the spirit and principles of the disclosure. For example, the drive transmission mechanism illustrated in FIG. 3 to FIG. 8 is one example, and the count and arrangement of gears that constitute the first drive transmission path 60 and the second drive transmission path 61 may be appropriately selected.

For example, in the embodiment described above, the one first idler gear 26 connects between the clutch idler gear 23*d* and the first output gear unit 25*a*. The one second idler gear 27 connects between the clutch output gear 23*c* and the second output gear unit 25*b*. However, the counts of the respective first idler gear 26 and second idler gear 27 used for connections may be two or more. Alternatively, the counts of the respective first idler gear 26 and second idler gear 27 may be different from one another.

An arrangement of the electromagnetic clutch 23 is not limited to the arrangement described above. For example, the electromagnetic clutch 23 may be located at any position between the first drive output gear 25, which is connected with the second drive transmission unit 50, and the motor 21.

The disclosure is not limited to the color printer 100, which employs a tandem system, illustrated in FIG. 1, and may be applicable to various kinds of image forming apparatuses such as a monochrome or a digital multi-functional peripheral, a monochrome printer, and a facsimile device.

The disclosure is applicable to a drive transmission mechanism that transmits a driving power to a plurality of rotated members, using a continuous rotation drive train and an intermittent rotation drive train. Use of the disclosure provides a drive transmission mechanism that ensures the reduced count of gears constituting the continuous rotation drive train and the intermittent rotation drive train and the reduced arrangement space of the gears in a simple configuration, and an image forming apparatus that includes the drive transmission mechanism.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A drive transmission mechanism for transmitting a driving power from a driving source, the drive transmission mechanism comprising:

an electromagnetic clutch including a clutch shaft, a clutch input gear, a clutch idler gear, and a clutch output gear, the clutch input gear surrounding at least a part of the clutch shaft and receiving the driving power, the clutch idler gear being coaxial with the clutch input gear and having a gear specification identical to the clutch input gear for receiving the driving power from the driving source, the clutch output gear being secured to the clutch shaft, energizing the electromagnetic clutch ensuring transmission of the driving power from the clutch input gear to the clutch output gear, non-energizing the electromagnetic clutch cutting off the transmission of the driving power from the clutch input gear to the clutch output gear;

a drive output gear including a first output gear unit and a second output gear unit, the first output gear unit being connected to the clutch idler gear via one or more first idler gear, the second output gear unit being connected to the clutch output gear via one or more second idler gear and located coaxially with the first output gear unit, the drive output gear ensuring the first output gear unit and the second output gear unit to be independently rotatable, wherein the drive transmission mechanism transmits the driving power using a first drive transmission path or a second drive transmission path, the first drive transmission path includes the clutch idler gear, the first idler gear, and the first output gear unit, the first drive transmission path transmitting the driving power to a rotated member connected to the first output gear unit irrespective of the energizing or the non-energizing the electromagnetic clutch, and the second drive transmission path includes the clutch output gear, the second idler gear, and the second output gear unit, the second drive transmission path transmitting the driving power to a rotated member connected to the second output gear unit only when the electromagnetic clutch is energized.

2. The drive transmission mechanism according to claim 1, wherein the first output gear unit and the second output gear unit have an identical gear specification.

3. The drive transmission mechanism according to claim 1, further comprising a rotation shaft with a step, wherein the drive output gear is rotatably supported by the rotation shaft, and the first output gear unit and the second output gear unit each have a boss portion into which the rotation shaft is inserted, the boss portions having mutually different diameters.

4. The drive transmission mechanism according to claim 3, wherein one of the first output gear unit and the second output gear unit includes the boss portion with an outer diameter smaller than an outer diameter and larger than an inner diameter of the boss portion of the other of the first output gear unit and the second output gear unit.

5. The drive transmission mechanism according to claim 1, wherein the drive transmission mechanism applies a load to a downstream of the clutch output gear in a driving power transmission direction of the second drive transmission path, the load having a magnitude for preventing corotation of the clutch output gear due to rotation of the clutch input gear when the electromagnetic clutch is not energized.

6. An image forming apparatus comprising the drive transmission mechanism according to claim 1.

\* \* \* \* \*